(12) United States Patent
Wan

(10) Patent No.: US 7,146,073 B2
(45) Date of Patent: Dec. 5, 2006

(54) FIBER DELIVERY SYSTEM WITH ENHANCED PASSIVE FIBER PROTECTION AND ACTIVE MONITORING

(75) Inventor: Xiaoke Wan, Port Jefferson Station, NY (US)

(73) Assignee: Quantronix Corporation, East Setauket, NY (US)

( * ) Notice: Subject to any disclaimer, the term of this patent is extended or adjusted under 35 U.S.C. 154(b) by 0 days.

(21) Appl. No.: 10/895,238

(22) Filed: Jul. 19, 2004

(65) Prior Publication Data

US 2006/0013532 A1    Jan. 19, 2006

(51) Int. Cl.
G02B 6/42   (2006.01)
G02B 6/26   (2006.01)
G02B 6/14   (2006.01)

(52) U.S. Cl. .............................. 385/29; 385/27; 385/28
(58) Field of Classification Search .................. 385/51, 385/61, 66, 70, 72, 78, 15, 27–31
See application file for complete search history.

(56) References Cited

U.S. PATENT DOCUMENTS

| | | | | |
|---|---|---|---|---|
| 4,716,288 A | * | 12/1987 | Doi | ........................ 250/227.11 |
| 4,781,428 A | * | 11/1988 | Epworth et al. | .............. 385/29 |
| 4,812,641 A | | 3/1989 | Ortiz Jr. | |
| 4,883,054 A | * | 11/1989 | Fuller et al. | ................... 606/12 |
| 4,887,879 A | * | 12/1989 | Prucnal et al. | ................. 385/48 |
| 5,012,087 A | * | 4/1991 | Rockstroh et al. | ..... 250/227.15 |
| 5,080,506 A | * | 1/1992 | Campbell et al. | ............. 385/29 |
| 5,159,402 A | * | 10/1992 | Ortiz, Jr. | .................. 356/237.1 |
| 5,219,345 A | * | 6/1993 | Potter | ........................... 606/15 |
| 5,251,001 A | * | 10/1993 | Dave et al. | ................. 356/73.1 |
| 5,319,195 A | | 6/1994 | Jones et al. | |
| 5,966,206 A | * | 10/1999 | Jander | ........................ 356/73.1 |
| 6,046,802 A | * | 4/2000 | Ortiz, Jr. | .................. 356/237.1 |
| 2005/0002607 A1 | * | 1/2005 | Neuhaus et al. | .............. 385/31 |
| 2005/0025418 A1 | * | 2/2005 | Brown | ......................... 385/31 |

* cited by examiner

Primary Examiner—John D. Lee
Assistant Examiner—Rhonda S. Peace
(74) Attorney, Agent, or Firm—Darby & Darby PC; Bruce E. Black

(57) ABSTRACT

In an optical fiber system for delivering laser, a laser beam is focused onto an optical fiber at an injection port of the system. The end portions of the fiber have cladding treatments to attenuate stray light and cladding mode light, so as to enhance the protection of the outer layer joint points. Photodetector sensors monitor scattered stray light, cladding mode light, and/or transmitted cladding mode light. Sensor signals are provided to a control unit for analyzing the fiber coupling performance. If need be, the control unit can control a laser shutter or the like to minimize or prevent damage. In materials processing applications, the photodetector signals can be analyzed to determine the processing status of a work piece.

16 Claims, 4 Drawing Sheets

FIBER DELIVERY SYSTEM WITH ENHANCED PASSIVE FIBER PROTECTION AND ACTIVE MONITORING

FIELD OF THE INVENTION

The present invention relates to fiber optic systems and methods and more particularly to fiber optic systems and methods for delivering laser.

BACKGROUND INFORMATION

Fiber delivered laser is widely used in materials processing such as drilling and cutting. Compared to traditional optical beam delivery methods, fiber delivery has several advantages including high flexibility, remote laser transportability, and enhanced safety.

Fiber delivery systems often include sensor units for monitoring the overall beam delivery integrity and the process condition of the work piece. Such sensor units are particularly important for avoiding fiber failures in high power laser applications. It is also desirable to have passive protection features to enhance the system's resistance to fiber failures.

As shown in FIG. 1, an optical fiber 10 generally consists of a fiber core 11, fiber cladding 12, and one or more outer layers 13. A light beam 15 can propagate through the fiber core because of total reflection between the fiber core 11 and the fiber cladding 12.

The maximum angle that a light beam 15 injected from air into the fiber core 11 can have to ensure total reflection in the fiber core, depicted as α in FIG. 1, is often defined as the numerical aperture (NA) of the fiber and is provided by the following expression:

$$NA = \sin\alpha = \sqrt{n_0^2 - n_1^2},$$

with $n_0$ and $n_1$ being the refractive index of the fiber core 11 and cladding 12 respectively. Both the core 11 and the cladding 12 are transparent at the light wavelength so that the light can be transported over a long distance with little attenuation.

The primary purpose of the outer layers 13 is to increase the mechanical integrity of the fiber. The outer layers 13 often comprise epoxy, nylon and plastic materials which may have strong absorption of the light.

Laser induced fiber failures tend to result from two sources: stray light, and cladding mode light. The former is apparent while the later one is often not realized. FIG. 2 illustrates stray light 21 and the generation of cladding mode light 22. The main portion of the injected laser beam is focused into the fiber core 11 within the acceptable NA of the fiber, and then it is coupled into fiber modes that propagate through the fiber core. Stray light 21 includes light leaking over the fiber core area, and light scattered at the fiber end surface which exceeds the acceptable NA.

The stray light 21 quickly dissipates over a fairly short distance. However, if a fiber holder or the outer layers are very close to the injection end, stray light can burn them immediately or generate thermo-stress which may gradually lead to a fiber failure.

FIG. 2 also shows the generation of cladding mode light 22, wherein a small portion of the light is launched into the cladding, and then sees the air and the fiber outer layers 13 as effective cladding layers. The cladding mode light 22 is guided through both the cladding and the core and propagates through the air-surrounded portion of fiber, or bare fiber, with little attenuation. In the portion of fiber surrounded by outer layers 13, the cladding mode light 22 experiences great attenuation because there are no total internal reflections between the cladding 12 and the outer layers 13. At the joint point between the bare fiber and the portion of fiber with outer layers 13, the cladding mode light has the strongest scattering and absorption. In one experiment, the attenuation at a single joint point was measured to be greater than 10 dB. It is evident that strong cladding light can also result in fiber failures.

Stray light and cladding mode light become stronger if the fiber is misaligned. Strong stray light and cladding mode light can also be generated because of back reflection. For instance, if the output light beam is focused at a highly reflective or scattering surface, a strong beam is coupled right back to the fiber. At the output fiber end, the back reflected beam always forms an image larger than the fiber core size so that a significant portion of the light becomes stray light and cladding mode light.

The risk of fiber failure due to stray light can be readily lowered by increasing the bare fiber length. The fiber end is fixed with a light transparent fiber holder. A thin sapphire chip is often used as the fiber holder in high power applications. Unfortunately, the bare fiber does not attenuate the cladding mode light, and the thin sapphire holder can hardly strip off the cladding mode light either. Therefore, the fiber connector is still vulnerable to cladding mode light.

To minimize the risk of fiber failures, the laser injection should allow most of the input laser power to be focused onto the fiber core, so that both stray light and cladding light can be minimized. Ideally, the fiber should always be kept aligned, and the back reflection should be carefully controlled. It is also desirable to continuously monitor the fiber delivery performance, so an active control can be engaged if a potential risk arises.

One widely used technique in fiber performance monitoring is using temperature sensors to detect local temperature changes due to heat generated by stray light and cladding mode light. This method has disadvantages of slow response and low accuracy.

Another approach is to use photodetectors, such as described in U.S. Pat. No. 4,812,641 (the '641 patent). The '641 patent describes a method of monitoring the couple efficiency by measuring input and output power with photodetectors. This method, however, has its limitations, especially for pulsed lasers. Experiments show that a small amount of cladding mode light can burn the fiber even before the couple efficiency shows a noticeable change.

Another technique is described in U.S. Pat. No. 5,319,195 (the '195 patent) in which photodetectors are used to monitor the intensity of light traveling in the cladding layer (cladding mode light) in the middle section of a fiber link. A strong sensor signal would indicate a fiber misalignment or a strong back reflection. The method described in the '195 patent is purported to be much more sensitive than the direct couple efficiency monitoring method. It is somewhat inconvenient, however, to embed sensors and electronics in the middle of a fiber link.

In light of the shortcomings of the known approaches, an alternate solution is thus required.

SUMMARY OF THE INVENTION

In an exemplary embodiment, the present invention provides a fiber delivery system with an active protection arrangement. In an exemplary embodiment, the laser is focused into the core of the fiber with a Plano-convex lens. The fiber end is held by a glass ferrule, which is transparent to the stray light and also straps off a portion of cladding mode light. The bare fiber portion preferably has a rough surface so that it further scatters off the stray light and cladding mode light. A photodetector facing the bare fiber detects the scattered light intensity. Another photodetector facing the input fiber end detects the intensity of back reflected cladding mode light. The sensor signals are sent to a control unit, which can control a laser shutter, or the like to turn off or divert the laser from the fiber. A similar arrangement can be provided for the fiber output port.

In further exemplary embodiments of the present invention, one or more passive techniques for protecting the fiber are provided by suppressing stray and/or cladding mode light. The passive protection techniques may be used individually or in combination, or may be combined with active protection techniques.

These and other aspects of the present invention are described below.

DETAILED DESCRIPTION

Figure 3:
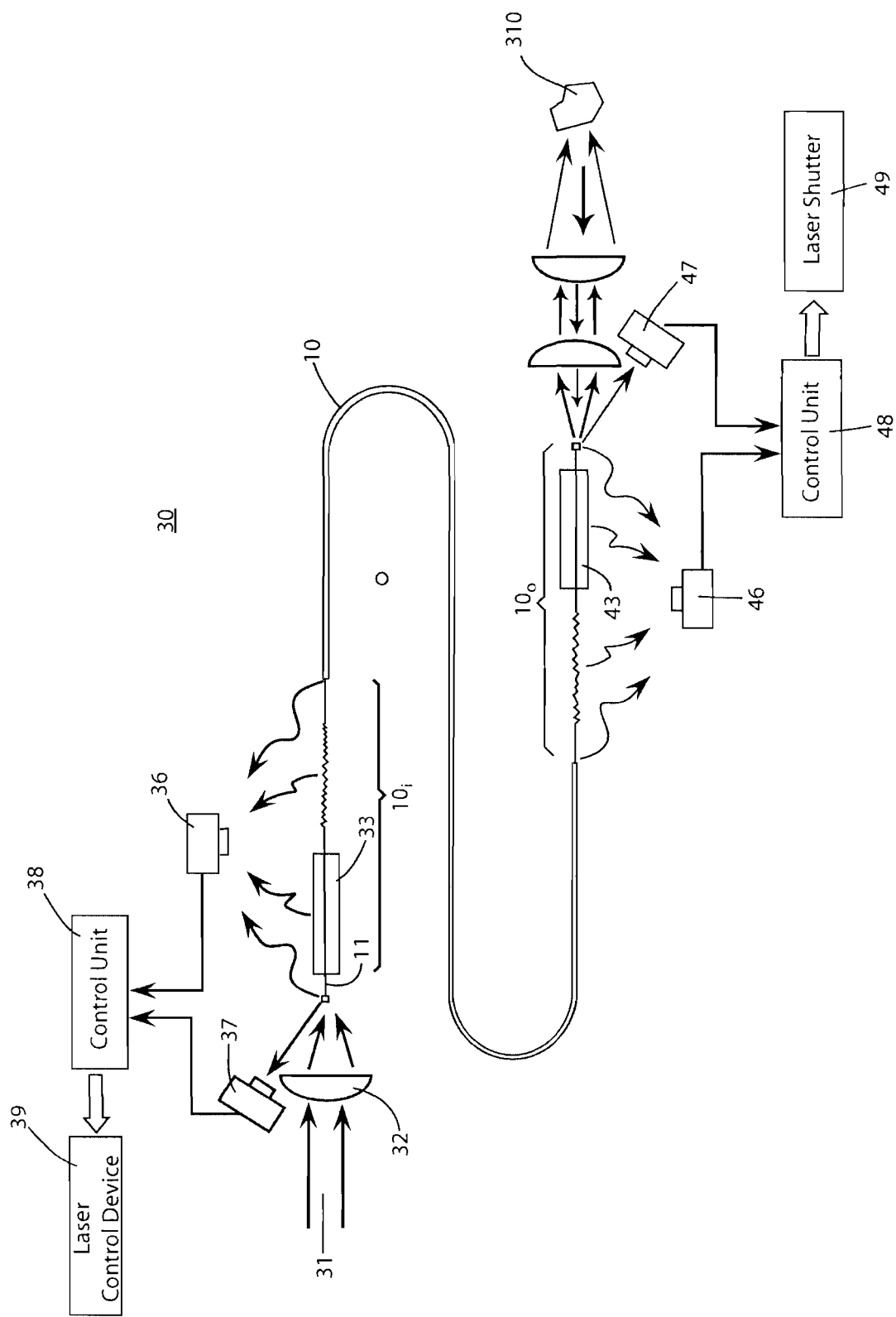
FIG. 3 shows a schematic representation of an exemplary embodiment of a laser delivery system comprising passive and active fiber protection arrangements in accordance with the present invention.

FIG. 3 shows a schematic representation of an exemplary embodiment of an optical fiber laser delivery system 30 in accordance with the present invention. In an exemplary materials processing embodiment, the system 30 delivers a laser beam 31 applied to an input port of the system via an optical fiber 10 to a work piece 310.

In the exemplary system of FIG. 3, the laser beam 31 is focused into the fiber core 11 of a fiber 10 with a planoconvex lens 32. A portion 10$i$ of the fiber 10 proximate to the input is bare; i.e., it does not include any outer layers of material. The bare fiber portion 10$i$ is held by a glass ferrule 33 which is transparent to any stray light and also strips off a portion of cladding mode light. Over at least a portion of its length, the bare fiber portion 10$i$ has a rough surface so that it further scatters off stray light and cladding mode light. The rough surface can be created in a variety of ways including, for example, sanding with a fine sand paper, sandblasting, chemical etching, and laser treatment. A first photodetector 36 facing the bare fiber portion 10$i$ detects the intensity of the light scattered off the bare fiber portion. A second photodetector 37 facing the input fiber end detects the intensity of back-reflected cladding mode light. The output signals of the photodetectors 36, 37 are provided to a control unit 38, which can control a laser control device 39 to disable or remove the laser beam 31 from the system. The laser control device 39 can be a laser shutter or the like. In an exemplary embodiment, when the magnitude of one or more of the signals from the photodetectors 36, 37 exceeds a predetermined threshold, the control unit triggers the laser control device 39 to disable the laser beam 31.

A second set of photodetectors 46, 47 and a further control unit 48 can optionally be provided for the fiber output port. Similarly to the input port, an portion 10$o$ of the fiber 10 proximate to the output port is bare with a rough surface and is held by a second glass ferule 43. Photodetector 46, which faces the bare fiber portion 10$o$, detects the intensity of the back-reflected light scattered off the bare fiber portion. Photodetector 47, which faces the output fiber end, detects the intensity of the forward propagating cladding mode light.

The further controller 48 can control a further laser control device 49 (e.g., a laser shutter or the like) to disable or remove the laser beam from the system, or it can control the laser control device 39 in conjunction with the controller 38. The controllers 38 and 48 can also be replaced by a single controller to which all of the sensor signals are provided and which controls the laser control device 39 and/or the further laser control device 49.

In further exemplary embodiments, any subset of the sensors 36, 37, 46 and 47 can be used by a controller to control the laser control device 39 and/or the further laser control device 49.

Figure 4:
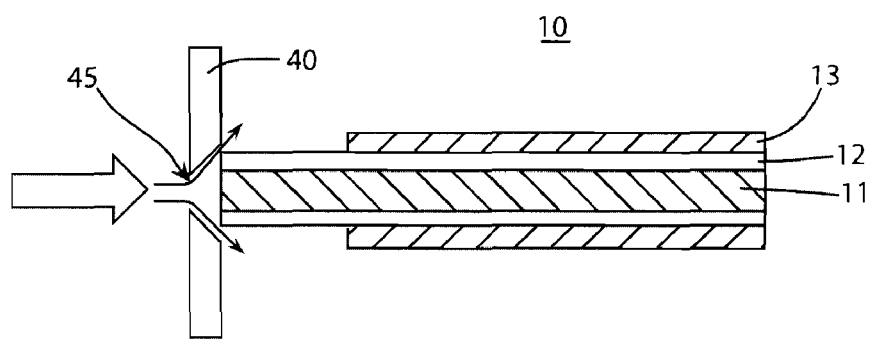
FIG. 4 illustrates the use of an aperture to block cladding mode light in an optical fiber.

The present invention provides several passive techniques for suppressing the cladding mode light propagating in a fiber, some of which have been illustrated in the arrangement of FIG. 3. A first such technique is illustrated in FIG. 4 which shows the arrangement of a plate 40 with an aperture 45 between the injection light beam and the fiber 10. The aperture 45 allows the light beam to pass to the fiber core 11, but blocks the light or changes the direction of the light which otherwise would be incident on the cladding 12. The plate 40 can be opaque (e.g., metal) or substantially transparent (e.g., glass). Opaque materials, however, are more susceptible to damage at high laser powers. Although a transparent plate 40 will allow light to pass therethrough, the dimensions of the aperture 45 and the spacing between the aperture and the fiber 10 can be selected so that light that would otherwise be directly incident on the cladding 12 will be deflected by the aperture 45 so that it does not enter the cladding or enters the cladding at an angle that causes the light to be quickly dissipated.

Another approach for suppressing the cladding mode light propagating in a fiber in accordance with the present invention entails treatment of the fiber end upon which the light beam is incident. Three exemplary fiber end treatments are illustrated in FIGS. 5A through 5C.

Figure 5A:
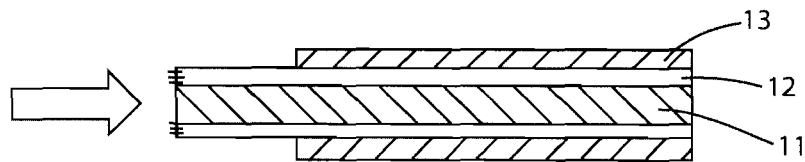
FIGS. 5A through 5C illustrate various techniques for suppressing cladding mode light in an optical fiber.

In the configuration of FIG. 5A, the cladding 12 at the end of the fiber upon which the light beam is incident (the "incident end") is made irregular or roughened by physical or chemical means, so that any light incident on this area is immediately scattered.

Figure 5B:
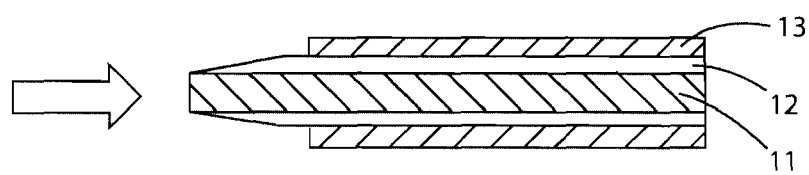

In the configuration of FIG. 5B, the cladding 12 at the incident end of the fiber is beveled so that any light entering the cladding cannot satisfy the total reflection condition, thereby preventing its propagation.

Figure 5C:
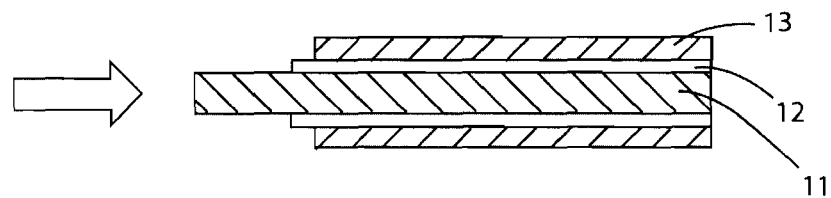

In the configuration of FIG. 5C, a portion of the cladding 12 proximate to the incident end of the fiber is stripped off, thereby weakening the cladding mode coupling because of defocusing.

Figure 6:
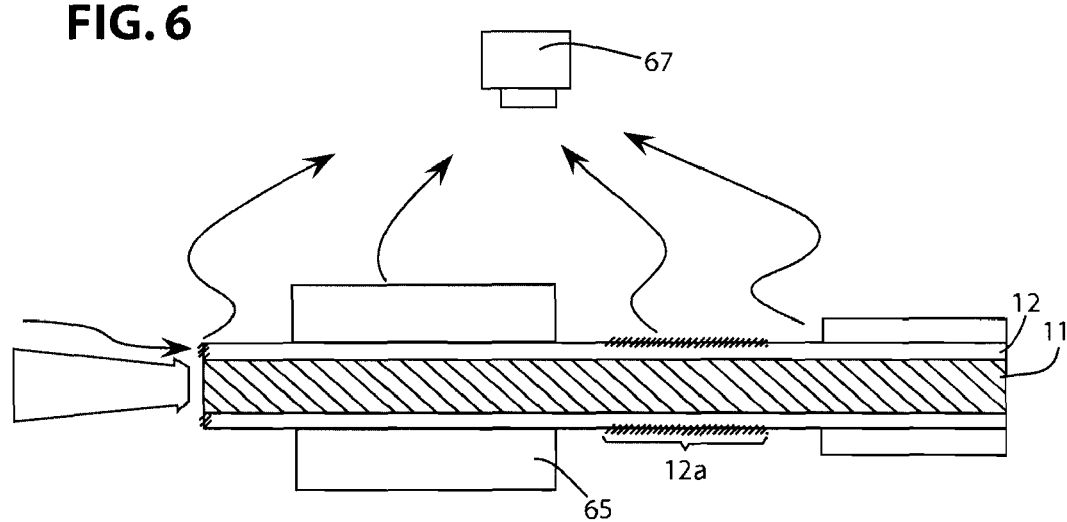
FIG. 6 illustrates a combination of various techniques for suppressing stray light and cladding mode light in an optical fiber.

Another technique for suppressing cladding mode light propagation in a fiber is illustrated in FIG. 6 in which a glass ferrule 65 is used to hold a bared portion of the fiber (see also FIG. 3). Glass ferrules with a wide variety of thicknesses and lengths are available. The ferrules are typically made of fused silica or the same materials used to make various fibers. By using a piece of glass fiber to hold the bare fiber end, the stray light is allowed to dissipate without absorption. The glass ferrule also helps to strip off the cladding mode light because the refraction index of the ferrule is larger or close to that of the fiber cladding. The longer the ferrule is, the greater the cladding mode light attenuation.

FIG. 6 also illustrates another technique for suppressing cladding mode light propagation which is to provide a rough surface on a portion 12a of the outer surface of the cladding 12 of the bare fiber. The rough surface can scatter off a great portion of cladding mode light. The rough surface can be made by grinding or other physical or chemical methods.

By applying one or more of the above-described passive techniques, the intensity of stray light or cladding mode light can be significantly reduced before reaching the fiber outer layer joint points, so the risk of fiber failures can be greatly lowered. These techniques can be applied at either or both of the input and output fiber connections or any other fiber junctions.

The present invention also provides active techniques for protecting fiber. As described above in connection with FIG. 3 and further below, photodetector sensors provide feedback to an active control unit for protecting the fiber from damage and ensuring beam delivery with good performance. Photodetectors can be are arranged to detect scattered stray light, cladding mode light, and/or back reflected cladding light.

As shown in FIG. 6, a photodetector 67 is placed in the vicinity of a fiber connector facing an incoming beam, which can be the injected laser beam or the back reflected beam. The photodetector 67 measures the intensity of the scattered light, which includes the combination of stray light and cladding mode light. The scattering source can be the fiber end, the fiber holder, the bare fiber side surface, or the junction point. The photodetector device 67 can also be a fiber-guided photodetector.

The photodetector signal is sent to a control unit. If there is a noticeable fiber misalignment or back reflection, the scattered light intensity will increase. The average photodetector signal is proportional to the average scattered light intensity, which is generally an increasing function of the risk of fiber failure and a decreasing function of fiber couple efficiency. The control unit can analyze the risk of fiber failures and the fiber coupling performance based on the sensor signal, and then can control laser shutters or other active components to prevent or reduce the risk of failures.

In some materials processing applications, the back reflected light beam carries different power fluctuations at different stages of processing. As the processing of the work piece progresses, the characteristics of the back reflected light beam will change. Particularly when the laser is operated under pulsed conditions, the back reflected laser pulse will exhibit different "signatures" at different processing stages. In an exemplary embodiment of the present invention, the control unit can analyze the photodetector signals and accordingly determine the current processing status of the work piece.

In the exemplary arrangement of FIG. 3, the photodetector 37 at the injection end monitors the injection condition while the photodetector 47 at the output end is responsible for monitoring the back reflected signals. Using photodetectors at both the injection and output ends of the laser delivery fiber provides greater flexibility and options for the implementation of control functions, as opposed to having a photodetector at just one of the ends.

Figure 1:
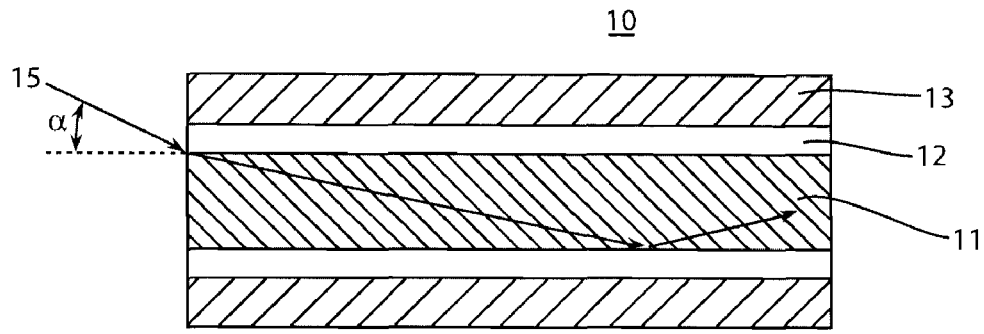
FIG. 1 shows a schematic representation of an optical fiber illustrating total reflection of a beam of light injected into the fiber.
Figure 2:
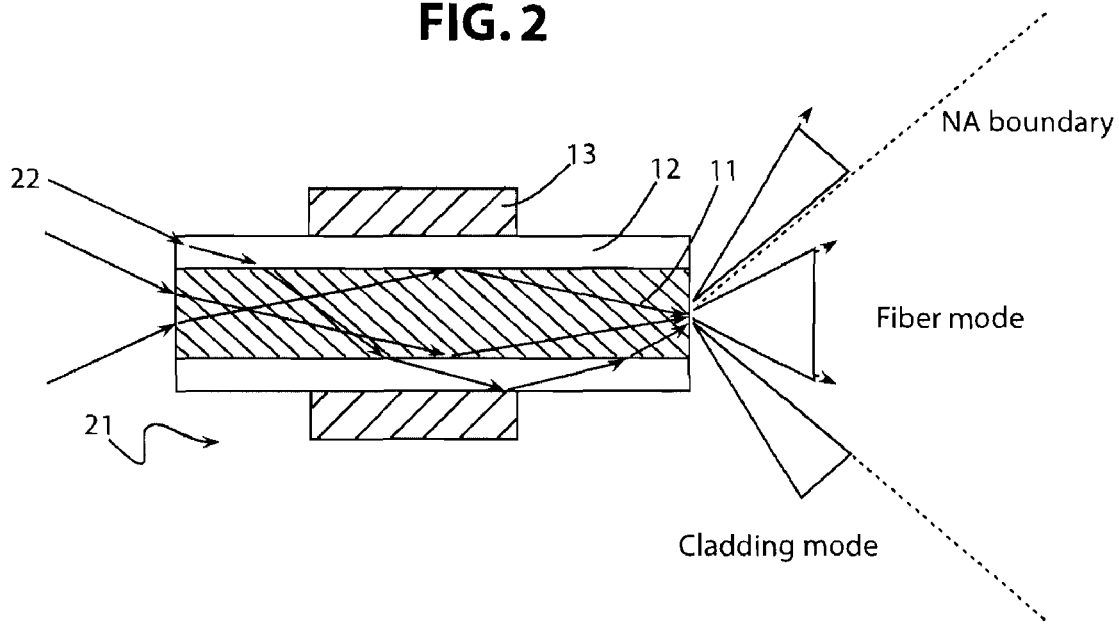
FIG. 2 shows a schematic representation of an optical fiber illustrating the propagation of fiber mode light, cladding mode light, and stray light.
Figure 7:
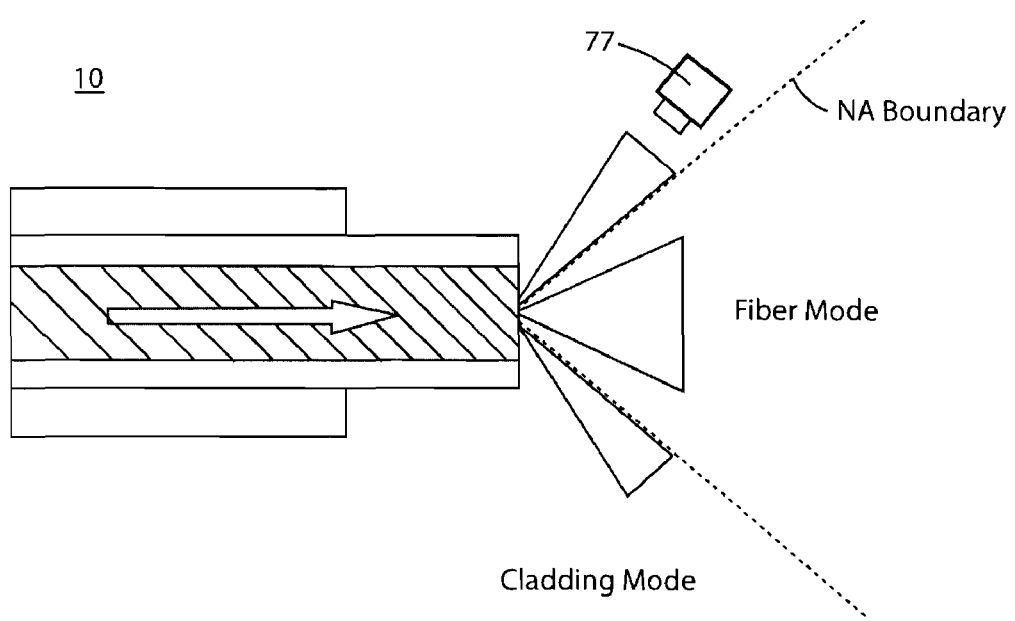
FIG. 7 illustrates the placement of a photodetector to detect cladding mode light in an optical fiber.

As shown in FIG. 2, cladding mode light travels in both the fiber cladding 12 and the fiber core 11 from one end of the fiber to the other. As shown in FIGS. 2 and 7, a significant portion of the cladding mode light emerges from the output end of the fiber and then diverges in the air with an angle larger than the minimum acceptable angle of the fiber mode light. Therefore, the cladding mode light is clearly separated from the fiber mode light by the fiber NA boundary. The cladding mode light at the output port can thus be detected by a photodetector. Similarly, the backward transmitted cladding mode light can also be detected at the input port.

As shown in FIG. 3, photodetectors can be arranged to face the exiting cladding mode light or to face an intermediate surface to detected the reflected or scattered cladding mode light signal.

It is to be understood that while the invention has been described above in conjunction with preferred embodiments, the description is intended to illustrate and not to limit the scope of the invention, as defined by the appended claims. Indeed, various modifications of the invention in addition to those described herein will become apparent to those skilled in the art from the foregoing description and the accompanying figures. Such modifications are intended to fall within the scope of the appended claims.

It is further to be understood that all values are to some degree approximate, and are provided for purposes of description.

The disclosures of any patents, patent applications, and publications that may be cited throughout this application are incorporated herein by reference in their entireties.

What is claimed is:

1. A system for protecting an optical fiber for delivering a laser beam, comprising:
    an optical fiber, wherein a proximal end of the optical fiber has been treated to reduce cladding mode light, wherein a surface of a proximal end of the optical fiber is rougher than a surface of another portion of the optical fiber;
    a detector for detecting a cladding mode light at a distal end of the optical fiber; and
    a controller for controlling the application of a laser beam to the proximal end of the optical fiber as a function of the cladding mode light detected at the distal end of the optical fiber.

2. The system of claim 1, comprising:
    a bare fiber portion proximate to the proximal end of the optical fiber; and
    a further detector for detecting a light scattered from the bare fiber portion,
wherein the controller controls the application of the laser beam to the proximal end of the optical fiber as a function of the detected light scattered from the bare fiber portion.

3. The system of claim 2 comprising a glass ferrule, the glass ferrule holding the bare fiber portion.

4. The system of claim 2, wherein the bare fiber portion comprises a portion of a surface of a cladding of the optical fiber which is rougher than another portion of the surface of the cladding to scatter light from the cladding.

5. The system of claim 1, comprising:
a further detector for detecting a back-reflected cladding mode light at the proximal end of the optical fiber,
wherein the controller controls the application of the laser beam to the proximal end of the optical fiber as a function as a function of the detected back-reflected cladding mode light.

6. The system of claim 1, comprising:
a bare fiber portion proximate to the distal end of the optical fiber; and
a further detector for detecting a light scattered from the bare fiber portion,
wherein the controller controls the application of the laser beam to the proximal end of the optical fiber as a function of the detected light scattered from the bare fiber portion.

7. The system of claim 6 comprising a glass ferrule, the ferrule holding the bare fiber portion.

8. The system of claim 6, wherein the bare fiber portion comprises a portion of a surface of a cladding of the optical fiber which is rougher than another portion of the surface of the cladding to scatter light from the cladding.

9. The system of claim 1 comprising an open aperture, the aperture being arranged between a source of the laser beam and the proximal end of the optical fiber.

10. The system of claim 1, wherein a cladding has been removed adjacent to the proximal end of the optical fiber.

11. A system for protecting an optical fiber for delivering a laser beam, comprising;
an optical fiber, wherein a proximal end of the optical fiber has been treated to reduce cladding mode light, wherein a proximal end of the optical fiber is beveled;
a detector for detecting a cladding mode light at a distal end of the optical fiber; and
a controller for controlling the application of a laser beam to the proximal end of the optical fiber as a function of the cladding mode light detected at the distal end of the optical fiber.

12. A method of protecting an optical fiber for delivering laser, comprising:
providing a bare fiber portion proximate to a first end of the optical fiber;
applying a laser beam to the first end of the optical fiber;
detecting a cladding mode light at the first end of the optical fiber by detecting a light scattered from the bare fiber portion; and
removing the laser beam from the first end of the optical fiber as a function of the detected light scattered from the bare fiber portion.

13. The method of claim 12, wherein the bare fiber portion comprises a portion of a surface of a cladding of the optical fiber which is rougher than another portion of the surface of the cladding to scatter light from the cladding.

14. A method of protecting an optical fiber for delivering laser, comprising:
applying a laser beam to a first end of the optical fiber;
detecting a cladding mode light at the first end of the optical fiber by detecting a back-reflected cladding mode light at the first end of the optical fiber; and
removing the laser beam from the first end of the optical fiber as a function of the detected back-reflected cladding mode light.

15. A method of protecting an optical fiber for delivering laser, comprising:
providing a bare fiber portion proximate to a second end of the optical fiber;
applying a laser beam to a first end of the optical fiber;
detecting a cladding mode light at the second end of the optical fiber by detecting a light scattered from the bare fiber portion; and
removing the laser beam from the first end of the optical fiber as a function of the detected light scattered from the bare fiber portion.

16. The method of claim 15, wherein the bare fiber portion comprises a portion of a surface of a cladding of the optical fiber which is rougher than another portion of the surface of the cladding to scatter light from the cladding.

* * * * *